United States Patent [19]

Zeley

[11] 4,042,224

[45] Aug. 16, 1977

[54] THERMAL CUTTING MACHINE FOR CUTTING UP CAST INGOTS DURING THE OPERATION OF CONTINUOUS CASTING PLANT

[75] Inventor: Juan Adalberto Zeley, Caracas, Venezuela

[73] Assignee: I.P.U. Limited, Nassau, Bahamas

[21] Appl. No.: 641,345

[22] Filed: Dec. 16, 1975

[30] Foreign Application Priority Data

Dec. 16, 1974 Germany ........................ 2459410

[51] Int. Cl.$^2$ ........................ B23K 7/00

[52] U.S. Cl. ........................ 266/50

[58] Field of Search ........................ 164/263; 266/50

[56] References Cited

U.S. PATENT DOCUMENTS

| | | | |
|---|---|---|---|
| 3,069,298 | 12/1962 | Stellmacher | 266/50 X |
| 3,227,432 | 1/1966 | McDermott | 164/263 X |
| 3,630,269 | 12/1971 | Bieri | 266/50 X |
| 3,929,324 | 12/1975 | Lotz et al. | 266/50 |

*Primary Examiner*—Roy Lake
*Assistant Examiner*—Paul A. Bell
*Attorney, Agent, or Firm*—Gifford, Chandler, Sheridan & Sprinkle

[57] ABSTRACT

The specification describes a thermal cutting machine for cutting up a continuously cast ingot during operation of a continuous casting plánt, comprising a clamping means for entrainment of the thermal cutting machine with movement of the continuously cast ingot. A drive moves the thermal cutting machine along the continuously cast ingot and a cutting burner can be adjusted transversely with respect to the continuously cast ingot and can be driven. The thermal cutting machine is substantially enclosed by a cooling shroud, which only has a few passages for shafts, more particulary of support wheels and furthermore for a drive shaft of the cutting burner holder and for an actuating linkage of the clamping means.

9 Claims, 9 Drawing Figures

9
9b
11
10
10b
10a
9a
6
6
4
40
6a
6a
4
8
12
7
5
5
5
5
3
3
6b
41
6b
13
41
1
2
1
2

4
9

3
3
11
4'
1

6c
9
4
14
7
6d
5
3

9c
9e
9d
16
15
9f 40
41
42
22
45
24
39
44
38
25
37
36
35
33
20
32
34
31
30
29
28
27
23
21
6
43
1

40
1
42
22

5
5
33
3
32
6
3
31
29
23
28
26
23
5
27
21

THERMAL CUTTING MACHINE FOR CUTTING UP CAST INGOTS DURING THE OPERATION OF CONTINUOUS CASTING PLANT

BACKGROUND OF THE INVENTION

1. Field to which invention relates

The invention relates to thermal cutting machines for continuous casting plants which are so constructed that they can operate during the operation of the respective continuous casting plant.

2. The prior art

Such thermal cutting machines operate more particularly with a gas oxygen flame with excess oxygen and are moved together with the progressively moving ingot, which in most cases radiates a large amount of heat. The thermal cutting machine is therefore subjected to a high thermal loading, something which is disadvantageous more especially as regards the drives necessary. Such drives have in accordance with the prior art been constructed with plates for thermal insulation and in some cases with double walls between which water flows, so as to provide shielding against the large amount of heat radiated by the cast ingot. A disadvantage as regards this type of shielding against radiant heat is the fact that complete and long lasting protection is not obtained. More particularly the supply lines, which are particularly sensitive, are insufficiently shielded.

SUMMARY OF INVENTION

One aim of the invention is that of constructing a thermal cutting machine of he specified type in such a manner that it is suitable for continuous operation with casting times of 6 hours and more without functional and operational reliability being impaired.

A futher object of the invention is that of guaranteeing accessibility to the individual parts of the thermal cutting machine, if the latter are accommodated with heat shielding.

A further aim of the invention relates to providing shielding for the supply lines, more particularly the flexible pipes for oxygen and hydrogen, and the cables.

In the case of the invention a cooling shroud is provided which is preferably arranged to have water flowing through it and surrounds the greater part of the thermal cutting machine with the exception of parts of the thermal cutting machine which have to be provided externally, as for example the burner head and the wheels for movement of the thermal cutting machine. The coolant supply and drain lines are simultaneously used for accommodating supply lines such as flexible tubes and cables, which in this manner are afforded protection against the action of heat. The cooling shroud is so constructed that it can easily be removed in order to provide access to the individual units of the thermal cutting machine. For this purpose the cooling shroud is either made up of individual shell halves and can be folded open or a drawer-like construction is provided in the case of which the cooling shroud — or the greater part of it including the wheels of the thermal cutting machine — can be moved with respect to the main part of the thermal cutting machine which for this purpose has additional rollers or wheels.

LIST OF SEVERAL VIEWS OF DRAWINGS

Further details of the invention will be explained with reference to the accompanying drawings.

DESCRIPTION OF PREFERRED EMBODIMENTS

Figure 1:
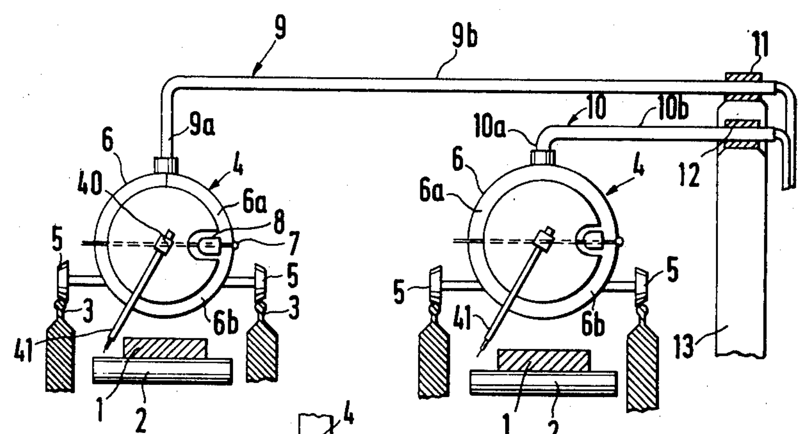
FIG. 1 shows a diagrammatic representation of thermal cutting machines arranged alongside one another.
Figure 2:
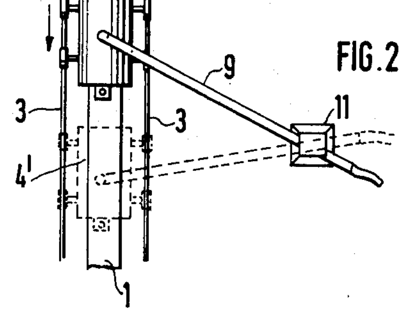
FIG. 2 shows a section from above a thermal cutting machine, also diagrammatically.

FIGS. 1 and 2 indicate the incorporation of the novel thermal cutting machine in a continuous casting plant. The ingot 1 to be cut by the machine is represented above a roller track 2. Several ingots 1 can be arranged one beside the other as is indicated in FIG. 1. To the side of or above each ingot 1 cooled rails 3 are provided on which the thermal cutting machine 4 is driven. The thermal cutting machine 4 is generally constructed like a carriage with wheels 5. The interior of the carriage is shielded by a cooling shroud 6 against the heat of the ingot 1 with its considerable thermal radiation and the cooling shroud 6 is so constructed that access can be gained to the interior of the carriage 4. For this purpose the cooling shroud 6 consists of two shell halves *6a, 6b,* which are connected together by means of a hinge 7 including connecting hoses 8 or flexible pipes. Via a divided pipe 9 cooling water is supplied and removed. The same applies for the carriage 4 shown on the right in the drawing, which is cooled via a section divided pipe 10. The pipes 9 and 10 have vertical sections *9a, 10a,* whose ends are journalled in a water-tight manner in the respective carriage 4 and there are furthermore horizontal sections *9b, 10b,* whose ends are accepted by V-shaped rests 11, 12, which are mounted in a pivoting manner in a column 13.

Figure 3:
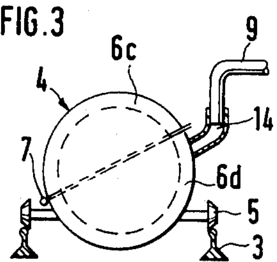
FIG. 3 shows diagrammatically a modified embodiment of a thermal cutting machine.

The cooling shroud 6 does not need to be divided in a horizontal plane and a subdivision as represented by *6c, 6d* can be provided having an oblique surface as is shown in FIG. 3. In this case the pipe 9 is connected via a pipe connector 14 with the lower half *6d.*

Figure 4:
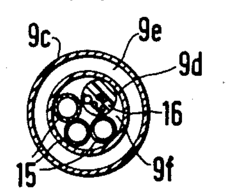
FIG. 4 shows part of the construction of FIGS. 1 to 3 on a larger scale.

The subdivision of the pipe 9, 10 can furthermore consist of a double shroud 9, *9d* (FIG. 4) so that an annular space *9e* is provided for the conveyance of the coolant in one direction and a core space *9f* is provided for the return of the coolant and for the accommodation of gas and compressed air flexible pipes 15 and cables 16, as will be gathered from FIG. 4.

Figure 5:
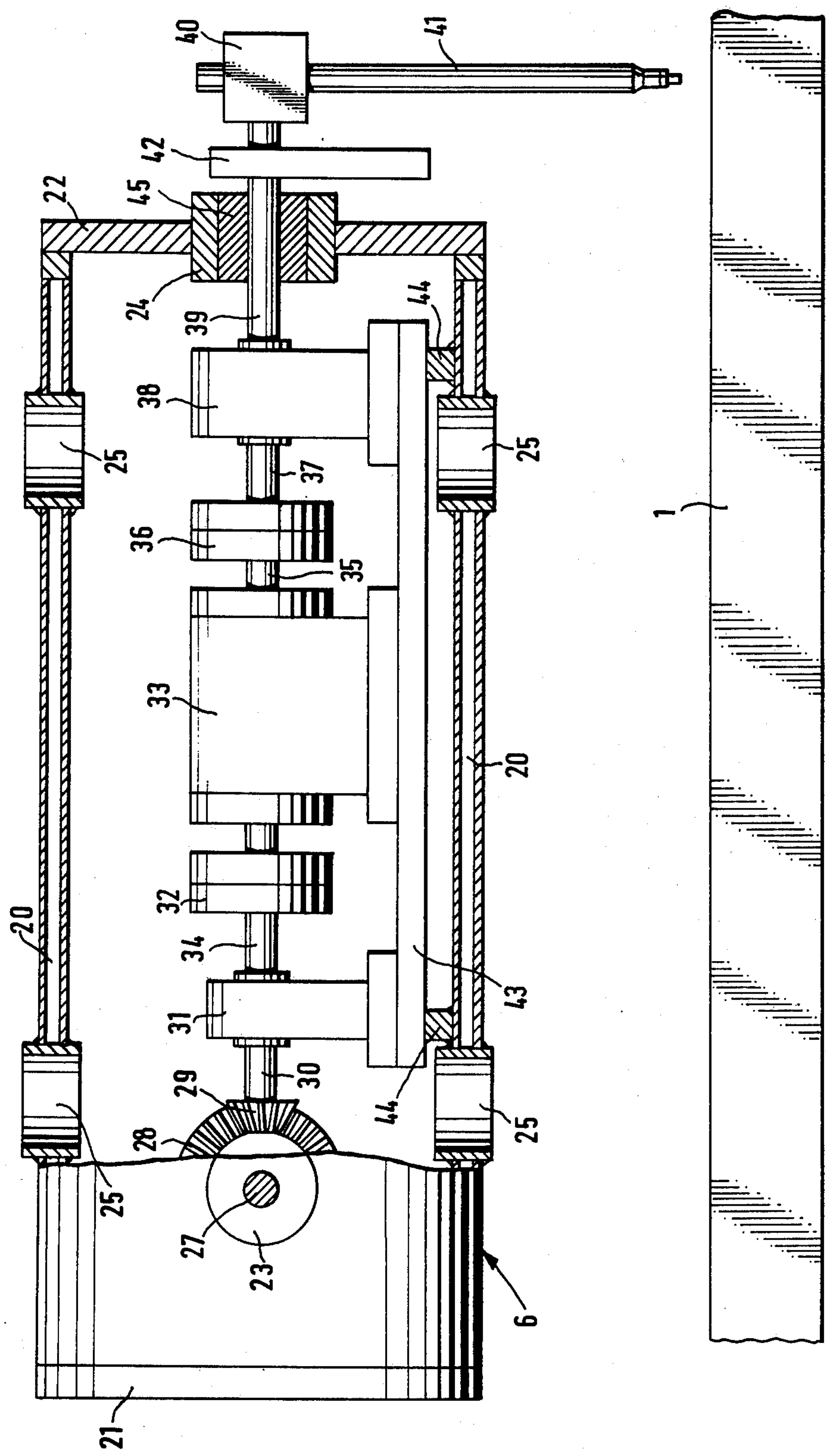
FIG. 5 shows a side view of a thermal cutting machine in the case of which certain parts are shown broken away.
Figure 6:
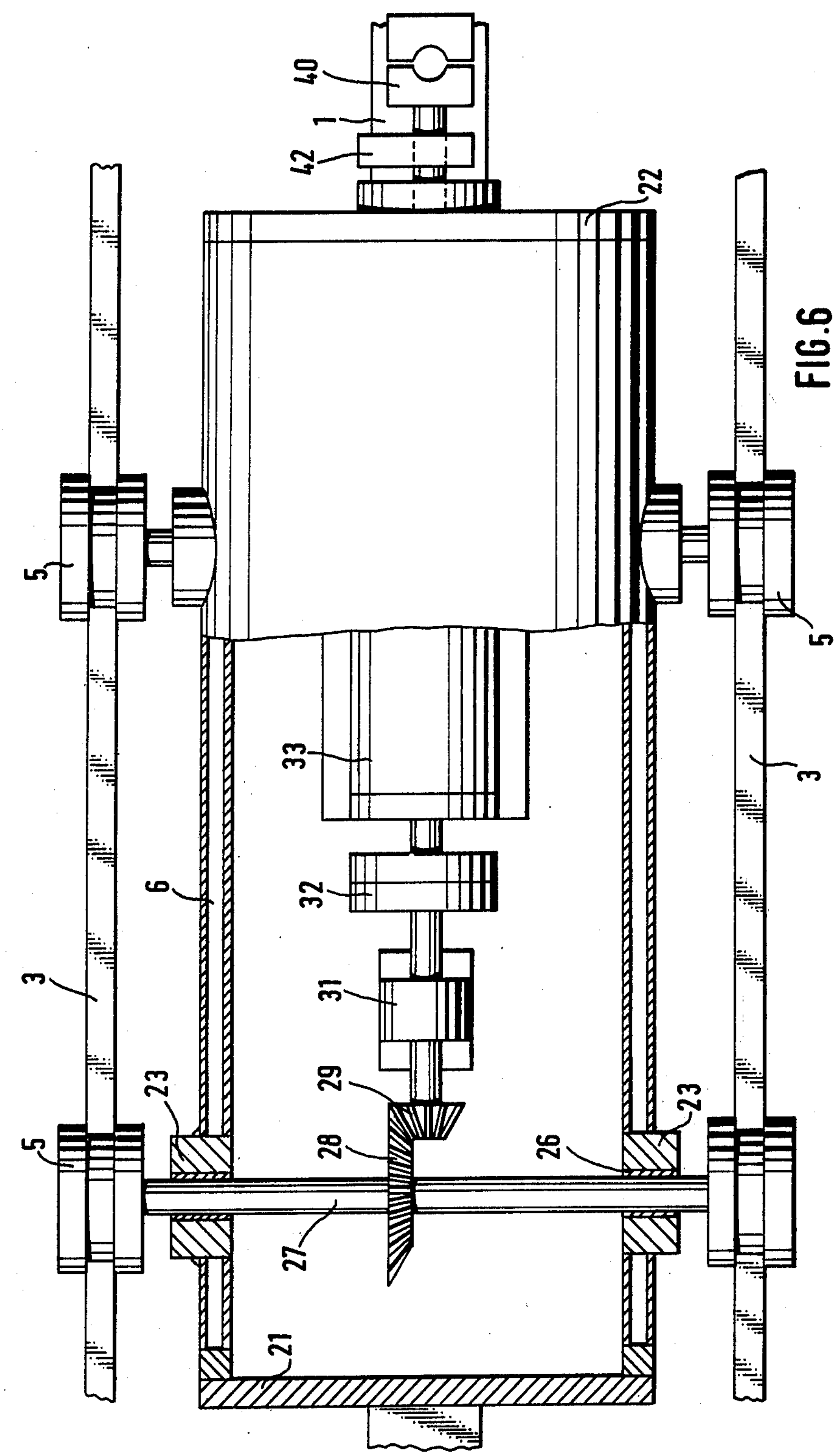
FIG. 6 shows a view from above, also with parts broken away.

FIGS. 5 and 6 show further details of the thermal cutting machine 4. For this purpose the cooling shroud 6 is shown cut open. As will be seen the cooling shroud has double walls 20 with a cavity for the cooling liquid and lid-like walls 21, 22, which can also have coolant spaces. The cooling shroud 6 furthermore has a number of openings or passage whose edges are reinforced by welded-in bushes 23, 24, 25. The bushes 23, which are respectively lined by means of a bearing 26, support a drive shaft 27 for the wheels 5 so that the carriage-like thermal cutting machine 4 can be driven on the rails 3. On the shaft 27 a bevel gear wheel 28 is mounted, which meshes with a further bevel gear wheel 29, which is mounted on a transmission shaft 30, which is supported by a bearing 31. The shaft 30 is driven via a remotely controlled clutch 32 by a motor 33, which has two drive shafts 34 and 35. The drive shaft 35 leads via a remotely operated clutch 36 and an intermediate shaft 37 to a thermal cutting drive 38, which ensures a reduction in speed and has a drive shaft 39, on whose end a burner holder 40 is attached, which carries a cutting burner 41. Since the shaft 39 only needs to be driven to move through a limited angular range, the return of the burner holder 40 into its initial position can be brought about by an eccentrically mounted weight 42. The drive described is mounted on a common platform 43, which is connected via feet-like supports 44 with the cooling shroud 6 in a detachable manner. It also remains to be mentioned that the shaft 39 is carried by a bearing 45, which is mounted in the bush 24.

Figure 7:
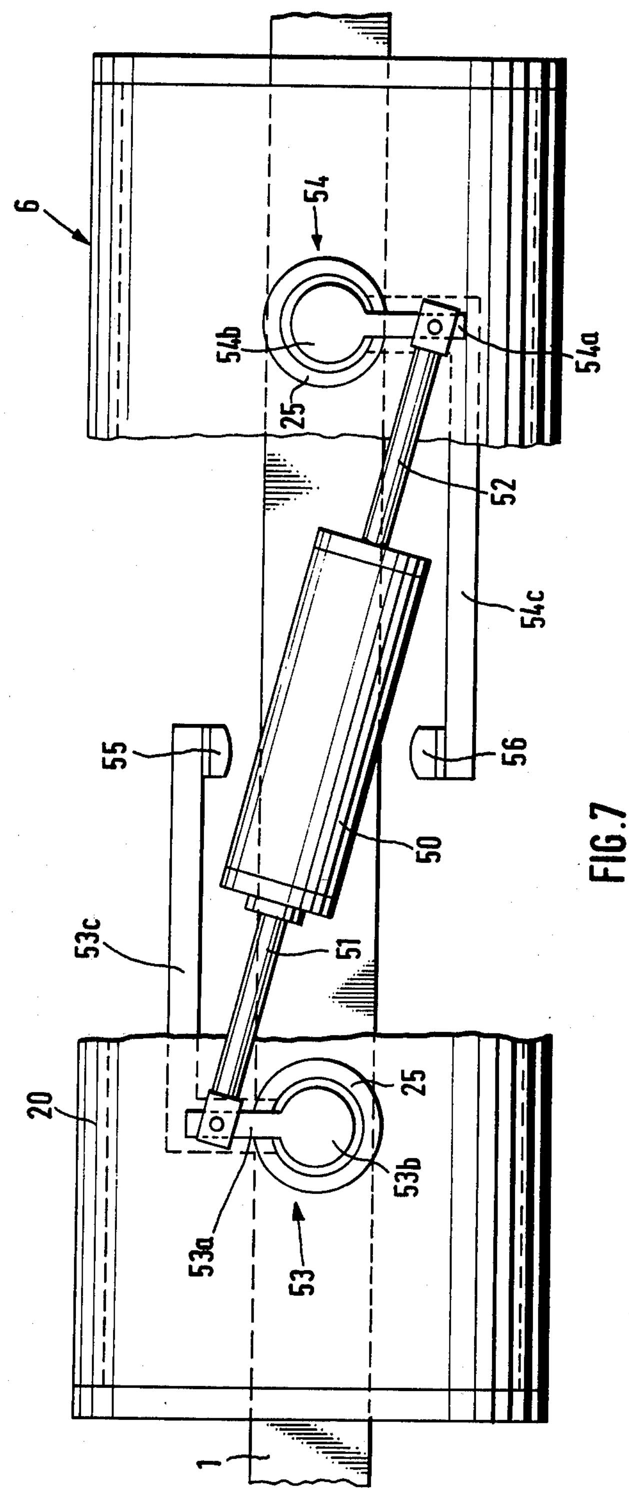
FIG. 7 shows a view from above of a thermal cutting machine in order to show a clamping means in the case of which other parts of the thermal cutting machine are omitted.

As is known continuous casting machines lead to the production of a continuously advancing ingot 1 so that the thermal cutting machine 4 must move during thermal cutting with the same speed as the ingot 1. For this purpose means are provided for coupling the carriage-like thermal cutting machine 4 with the ingot 1 and the respective means for ensuring this are described with reference to FIG. 7. Above the cooling shroud 6 a compressed air actuator 50 is arranged, which has two actuated pistons with thrust rods 51, 52, which are respectively connected with crank-like actuating linkages 53 and 54 respectively. The actuating linkages 53, 54 are journalled in the respective bushes 25 and so constructed that on their pivoting over a limited angular range they do not engage either the wheel drive or the burner drive. As regards details the actuating linkages 53, 54 are therefore constructed With bell cranks, which can consist of several parts, for example of a crank arm 53*a*, a shaft 53*b*, and a crank-like arm 53*c*. The actuating linkage 54 is provided with corresponding parts *a, b,* and *c.* At the end of the crank-like arms 53*c*, 54*c* respective gripping jaws 55, 56 are mounted, which lie in the plane of the ingot but to the side of it. When the compressed air cylinder is actuated to produce inward movement of the thrust rods 51, 52, the actuating linkages 53, 54 move in a clockwise direction in terms of the drawing so that the gripping jaws 55, 56 come to engage the flanks of the ingot 1 and lead to a firm engagement of the carriage-like thermal cutting machine 4 with the ingot 1. In this manner it is possible to ensure entrainment of the thermal cutting machine 4 with the same speed as the speed of advance of the ingot 1.

Return movement of the thermal cutting machine into its initial position is ensured by the drive of the wheels 5 already described.

Figure 8:
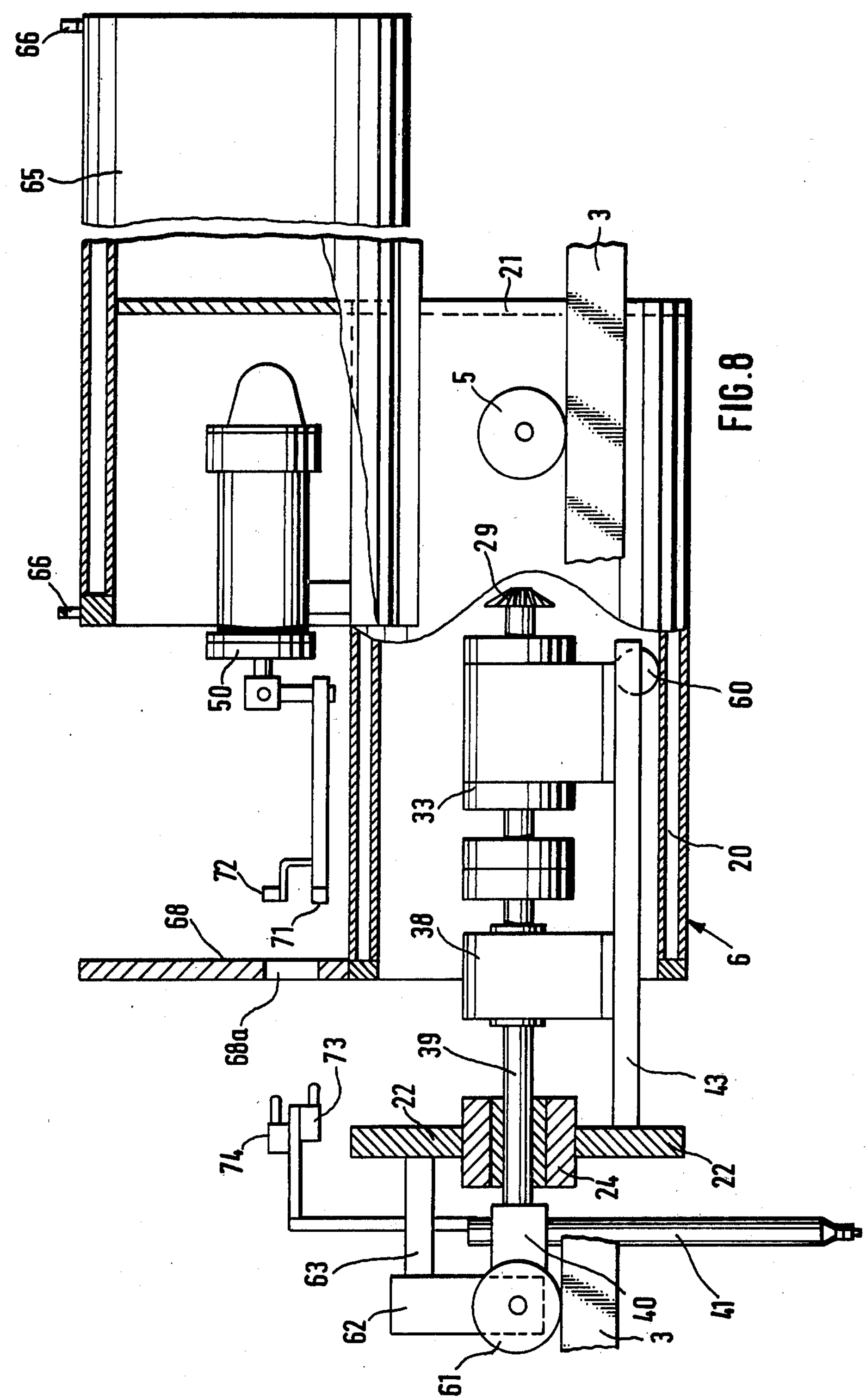
FIG. 8 shows a side view of a further embodiment of a thermal cutting machine, partly in section.
Figure 9:
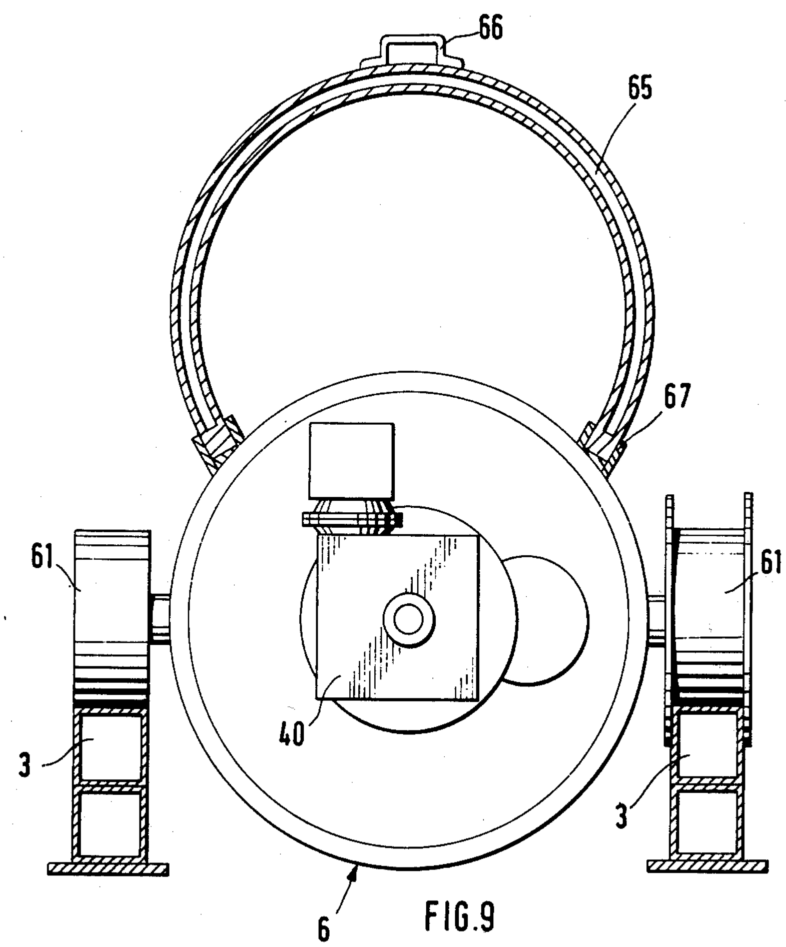
FIG. 9 shows a view from the front of the thermal cutting machine, also with parts broken away.

FIG. 8 shows a modification of the cooling shroud having regard to providing particularly satisfactory accessibility of the parts to be shielded of the thermal cutting machine for servicing purposes. The platform 43 is in this respect attached to the one lid wall 22 and the supports 44 are replaced by rollers or wheels 60, 61, of which the roller 60 can run along the inner side of the lower double wall 20 while the rollers 61 correspond to the wheels 5 and run on the rails 3. The rollers 61 are journalled in a roller holder 62 and connected by means of a bridge piece 63 with the lid wall 22 in a firm manner. In this manner a three-wheeled trolley is formed which is made up with the parts 22, 43, 60, 61, 62, and 63. Since the cooling shroud 6 can be displaced with the two wheel pairs 5 on the rails 3, it is possible, after undoing the screws on the lid wall 22 to move the cooling shroud somewhat to the right in terms of the drawing without the parts 29 to 41 being caused to fall, because the three-wheeled trolley shown prevents this.

The cooling shroud 6 can have a hood 65 mounted on it, which is provided for shielding the clamping device, and more particularly the compressed air cylinder 50 and the thrust rods 51, 52. The hood 65 has similar double walls to those of the cooling shroud and can be displaced by means of gripping means 66 on rails 67 as soon as the screws at a front wall 68 have been undone.

The front wall 68 has a recess 68*a*, through which normally, that is to say when the lid wall 22 is screwed in place, a sensing connection for sensing the edges of the ingot 1 is made ready for operation. The position of the edges of the ingot 1 is thus significant for the initial and the end positions of the cutting burner 41 and the information is obtained in the following manner. The actuating linkage 53 or 54 has an extension 70, which itself consists of a lever linkage not shown specifically, on whose ends cams 71, 72 are arranged. These cams cooperate with limit switches 73, 74, that is to say for positioning the cutting burner 41 is caused to move until the limit switch 73 engages the cam 71 following which the burner 41 is stopped with the correct distance from the edge of the ingot 1. For the cutting operation the burner 41 is pivoted again and when the end or limit switch 74 engages the cam 72 the burner 41 is stopped.

I claim:

1. A thermal cutting machine for cutting a continuously cast ingot moving in a longitudinal direction comprising:

rail means for longitudinally movably supporting said machine at a position spaced from and parallel to said ingot;

means for clamping said machine to said ingot whereby said machine moves along said rail means in unison with said ingot;

a cutting burner;

means for moving said cutting burner transversely across said ingot to thereby cut said ingot;

an outer cooling shroud substantially enclosing said cutting machine, said cooling shroud having double walls in a spaced relation and adapted to receive a cooling fluid therebetween; and articulated pipe means coupled at one end to said cooling shroud and adapted both to supply a cooling fluid from an external source between said walls and to remove cooling fluid already present between said walls.

2. The invention as defined in claim 1 wherein said rail means further comprises:

at least one stationary rail exteriorly of said cooling shroud; and at least one support wheel adapted to engage said stationary rail and having a portion extending through a bushing in said cooling shroud to the interior of said cooling shroud.

3. A thermal cutting machine as defined in claim 1 characterized in that the cooling shroud has a detachable end wall, a platform connected to said end wall and adapted to carry said moving means for said cutting burner, at least one roller rotatably connected underneath said platform and adapted to roll along the inner surface of said cooling shroud so that the end wall with the attached platform can be moved with respect to the cooling shroud.

4. A thermal cutting machine as defined in claim 1 characterized in that the clamping means includes an actuator protected by a hood which is slidably mounted to the cooling shroud.

5. A thermal cutting machine as defined in claim 4, characterized in that an end wall of the hood is provided with an opening, said burner having operating contacts which control the transverse travel of the cutting burner wherein said contacts extend through said opening and into the interior of said hood.

6. A thermal cutting machine as defined in claim 1 characterized in that the cooling shroud consists of two cooling shell halves pivotally connected with each other.

7. A thermal cutting machine as defined in claim 6, characterized in that the separation plane of the cooling shell halves is inclined with the horizontal and that the connection of the pipe means with said cooling shroud is at the lower shell half.

8. A thermal cutting machine as defined in claim 6 characterized in that the other end of the pipe means is pivotally and displaceably mounted to a stationary column.

9. A thermal cutting machine as defined in claim 8, characterized in that the column has further pipe means for further thermal cutting machines, the pipe means being arranged in different vertical planes.

* * * * *

UNITED STATES PATENT AND TRADEMARK OFFICE

CERTIFICATE OF CORRECTION

PATENT NO. : 4,042,224

DATED : August 16, 1977

INVENTOR(S) : Juan Adalberto Zeley

It is certified that error appears in the above-identified patent and that said Letters Patent are hereby corrected as shown below:

Col. 1, line 33, delete "he", insert --the--.

Col. 2, line 43, delete "section", insert --second--.

Col. 3, line 40, delete "With", insert --with--.

Signed and Sealed this

*Eighth* Day of *November 1977*

[SEAL]

*Attest:*

RUTH C. MASON
*Attesting Officer*

LUTRELLE F. PARKER
*Acting Commissioner of Patents and Trademarks*